(12) United States Patent
Ershov

(10) Patent No.: US 7,529,743 B1
(45) Date of Patent: *May 5, 2009

(54) GUI FOR SUBJECT MATTER NAVIGATION USING MAPS AND SEARCH TERMS

(75) Inventor: Alexander V. Ershov, Sergiev Posad (RU)

(73) Assignee: Quintura, Inc., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/028,821

(22) Filed: Feb. 10, 2008

Related U.S. Application Data

(63) Continuation of application No. 11/957,281, filed on Dec. 14, 2007.

(60) Provisional application No. 60/891,542, filed on Feb. 26, 2007.

(51) Int. Cl.
 *G06F 17/30* (2006.01)
(52) U.S. Cl. .............................. 707/3; 707/10; 706/12; 706/20
(58) Field of Classification Search ...................... 707/3, 707/10; 715/853, 854; 706/12, 20
See application file for complete search history.

(56) References Cited

U.S. PATENT DOCUMENTS

| | | | | |
|---|---|---|---|---|
| 5,619,709 | A * | 4/1997 | Caid et al. .................... | 715/209 |
| 6,166,739 | A * | 12/2000 | Hugh .......................... | 715/854 |
| 6,189,002 | B1 * | 2/2001 | Roitblat ......................... | 707/1 |
| 6,233,575 | B1 * | 5/2001 | Agrawal et al. ................ | 707/6 |
| 6,304,864 | B1 * | 10/2001 | Liddy et al. .................... | 706/15 |
| 6,336,112 | B2 * | 1/2002 | Chakrabarti et al. ............ | 707/5 |
| 6,385,602 | B1 * | 5/2002 | Tso et al. ....................... | 707/3 |
| 6,513,036 | B2 * | 1/2003 | Fruensgaard et al. ........... | 707/4 |
| 6,633,868 | B1 * | 10/2003 | Min et al. ....................... | 707/3 |
| 6,748,375 | B1 * | 6/2004 | Wong et al. .................... | 707/3 |
| 6,801,229 | B1 * | 10/2004 | Tinkler ........................ | 715/853 |
| 6,868,525 | B1 * | 3/2005 | Szabo .......................... | 715/738 |
| 6,931,604 | B2 * | 8/2005 | Lane ........................... | 715/853 |

(Continued)

OTHER PUBLICATIONS

Dursteler, Juan C., InfVis, http:/infovis.net/printMag.php?num=97&lang=2, KartOO, Aug. 19, 2002.*

(Continued)

*Primary Examiner*—Jean M Corrielus
(74) *Attorney, Agent, or Firm*—Bardmesser Law Group

(57) ABSTRACT

A system, method and computer program product for navigating categorized information, including (a) a two-dimensional map displayed to a user on a screen, the map showing search terms relating to a subject matter, where the display of the search terms corresponds to relationship between the terms, and wherein a manner of display of the terms corresponds to their relative importance to the subject matter; and (b) a neural network underlying the map, wherein the manner of display and a selection of the search terms is derived from the neural network. The manner of display includes font color, font size, font transparency, distance between search terms and positioning of the search terms within the map. Positioning of a cursor over one of the search terms rearranges the search terms on the map to correspond to an increased relevance of the one of the search terms, while the cursor is over the one of the search terms. Clicking on the one of the search terms corresponds to navigating into a sub-subject matter of the one of the search terms.

15 Claims, 28 Drawing Sheets

U.S. PATENT DOCUMENTS

| | | | | |
|---|---|---|---|---|
| 6,961,731 | B2* | 11/2005 | Holbrook | 707/102 |
| 7,054,870 | B2 | 5/2006 | Holbrook | |
| 7,251,637 | B1* | 7/2007 | Caid et al. | 706/15 |
| 7,284,191 | B2* | 10/2007 | Grefenstette et al. | 715/230 |
| 7,496,548 | B1* | 2/2009 | Ershov | 706/20 |
| 2005/0144158 | A1* | 6/2005 | Capper et al. | 707/3 |

OTHER PUBLICATIONS

Rizzo et al., "Spatial Organization using self-organizing Neural Networks",, 2002.*

Powers et al., "The magic Science of visualization", 2003.*

Tamara Munzner, Visualizing the structure of the world wide web in 3D hyperbolic space, ACM, 1995.*

Nicholas G. Tomaiuolo, "Answers.com and Xrefer: The Chevy and Bimmer of Ready reference", Jul./Aug. 2005.*

Dittenbach et al., "Using a Connectionist Approach for Enhancing Domain Ontologies: Self-Organizing word category maps revised", 2003.*

Benford et al., "Three Dimensional Visualization of the World Wide Web", 2000.*

A Divergent-Style learning Support Tool for english Learners Using a Thesaurus Diagram, KES 2006, Part III, LNAI 4253, pp. 867-874.* www.visualthesaurus.com/howitworks/manual/, Oct. 18, 2000, pp. 1-23.*

* cited by examiner skating and blading sports
swimming and diving reptiles and amphibians computers and games
sports and recreation solar system science and nature
united states
zoos and aquariums                    world wide web
toy story around the world   boxing day
rap and hip-hop        countries
        stuffed toys         art history
        teddy bears              cars and trucks
        television shows
tall tales    fairy tales  activities holidays
              cartoons movies    toys      toys of the past
religious stories  stories    arts and entertainment
language arts
              music                        action figures
    stories by young writers         virtual pets
social studies school bell actors   giga pets young musicians
jokes and riddles
brass and wind instruments
stringed instruments
                folk and traditional  comics and animation
        drums and percussion
clubs and organizations  fun and humor academic programs

FIG.1 theater and drama studios  theatre
          photography
rap and hip-hop  dance
          architecture
          performing arts
radio television shows
          toys    countries      united kingdom
              activities
play sites   titles   pictures   museums
                  music
                     videos   canada
opera       sounds  arts and entertainment   art history
    classical           movies   australia   around the world
    composers  actos
              musicians      cartoons
         jazz crafts   animated       comics and animation fashion individual artists  networks    fireworks
                              comics and animation fun and humor    electronic greeting cards

FIG.3 spice girls theater and drama young musicians stringed instruments studios theatre
rap and hip-hop dance photography
architecture
performing arts
radio television shows
toys countries united kingdom
activities
play sites titles pictures museums
music  videos canada
opera orchestras arts and entertainment art history
classical movies australia around the world
composers actors
mariachi cartoons brass and wind instruments
jazz blues
lyrics
crafts animations drums and percussion animation
folk and traditional
fashion education individual artists networks fireworks
comics and animation fun and humor electronic greeting cards

FIG.4 skating and blading sports
swimming and diving reptiles and amphibians weather computers and games sports and recreation solar system science and nature united states zoos and aquariums world wide web toy story physics  science around the world  boxing day rap and hip-hop stuffed toys  countries paleontology art history teddy bears  physical sciences cars and trucks television shows  astronomy and space tall tales  actnature  holidays  aquatic life fairy tales  cartoons movies  toys  toys of the past  botany religious stories  stories  arts and entertainment  biology language arts  medicine music  actioncomputer science stories by young writers  actorsliving things  virtual pets  chemistry social studies  school bell  giga pets  environment inventions  ecology young musiciansgeology jokes and riddles history of science brass and wind instruments stringed instruments  folk and traditional  comics and animation drums and percussion clubs and organizations  fun and humor academic programs

FIG.6 airplanes and flying measurements and units    spacecraft                                              york
                          solar system
                          astronomy and space        united kingdom prehistoric animals        museums and exhibits
inventions                              unites states    florida
      machines      paleontology           california    zoos and aquariums
                                        canada   around the world
            the earth      volcanoes   countries
                                    new zealand                      hawaii
            geology                australia
                          science and nature
reptiles and amphibians    weather   environment
                                                    birds
            physics    ecology
            chemistry                      mammals
physical sciences   biology
                                        invertebrates   aquatic life
      medicine                       living things human spaceflight
                          botany cars and trucks
history of science computer science
                    diseases and conditions
                    health and safety

FIG.7 trilobites                                                                                     airplanes and flying  uc museum of paleontology measurements and units    spacecraft                                                      york types of dinosaurs      solar system
                          astronomy and space
                                            united kingdom prehistoric animals       museums and exhibits inventions                  saber-toothed u̶t̶i̶g̶e̶r̶s̶tates  florida machines     paleontology ✪       california      zoos and aquariums
                                       canada   around the world
             the earth    volcanoes   countries
                                 new zealand              hawaii
          geology             australia
                   science and nature
                                                archaeopteryx
reptiles and amphibians   weather   environment
                   mastodons            birds  brontotherium
        physics    ec̶o̶l̶o̶g̶y̶mammoths
          chemistry                         mammals
                    biology             dire wolves
physical sciences
                                     invertebrates      aquatic life
    medicine               ichthyosaur fossils
                                 living things
                     giant sloths human spaceflight
                     botany cars and trucks
history of science computer science
                   diseases and conditions
                 health and safety

FIG.8 uc museum of paleontology museums and exhibits california prehistoric animals the earth videos      pictures science and nature    fossils sounds                                   geology paleontology mammals biology evolution genetics

FIG.9 swimming and diving traditional and board games
typing
reptiles and amphibians
word games
computers and games
sports and recreation
solar system
science and nature
united states
zoos and aquariums reviews sega world wide web
toy story
prediction games screen savers and wallpaper
around the world boxing day
sports games
stuffed toys nintendo
art history
teddy bears online games cars and trucks
television shows
tall tales activities holidays animal games
fairy tales
cartoons movies toys toys of the past apple computer
religious stories stories arts and entertainment clip art
language arts
microsoft xbox computer and video games
music action figures
consoles and systems
stories by young writers actors virtual pets
social studies school bell giga pets
internet tutorials
young musicians cheats, hints, and codes
jokes and riddles
brass and wind instruments
stringed instruments
folk and traditional comics and animation
drums and percussion
clubs and organizations fun and humor academic programs

FIG.10 traditional and board games
software companies sports games     animal games     typing matching games
online games prediction games     word games
shareware     mazes     sonic the hedgehog series web page design
puzzles clip art
history     world wide web sony playstation     halloween     apple computer
microsoft xbox    reviews    pictures    safety
nintendo     computers and games
consoles and systems   pokemon sega    cheats, hints, and codes    entertainment     internet tutorials screen savers and wallpaper
computer and video games titles
backyard sports     animals and nature
roller coaster tycoon
microsoft corporation crash bandicoot series
monkey island series
dbz hyper dimension
mega man    donkey kong series ethics game companies

FIG.11 traditional and board games   tangrams
tetris                software companies sports games         animal games         typing matching games
online games ⊗ prediction games   word games
   shareware       mazes         sonic the hedgehog series
                                       web page design
                   puzzles
                         clip art
                history              world wide web
          presidency    halloween
sony playstation                              apple computer
  microsoft xbox  online  pictures    safety
   nintendo       computers and games
        consoles and systems                anagrams
                          pokemon
                                              internet tutorials
                        entertainment
  sega   cheats, hints, and codes      concentration
                                  screen savers and wallpaper
                computer and video games  chess
                                  checkers
                       titles
                            backyard sports    animals and nature
                      roller coaster tycoon
microsoft corporation              hangman
                              crash bandicoot series
       monkey island series
              dbz hyper dimension
                       donkey kong series
      mega man ethics game companies

FIG.12 tangrams shareware sports games tetris animal games concentration                       videos
checkers
scrambles and sliders   traditional and board games
                        tic tac toe
                        online games
                        computers and games
                        word searches
                        crossword puzzles anagrams
chess                                    word games history
                    mazes       hangman
prediction games matching games

FIG.13 web directories problem mobilization aspect libraries    red hot mamas action                                aphrodite council news and media project network                                            breasts african              national education    research independent        issues                                    boston menstruation              nonprofit    organizations magazines                                                                                  abuse women's health          environment resource focus                                    books info forums initiative              article              links early menopause expert fashion              chats kegel exercises                        message black ireland                                                    imperative femina iaawh hormone replacement therapy (hrt)

female genitalia

FIG.18 american business women's association recreation stay-at-home mothers business and economy
shopping and services training risk review menopause movies and film mom
tip romance
resource
protest work business
parenting organizations
pageant home information
feature
nutrition travel sports
style fitness
entertainment
magazines health
love
relationship
beauty
fashion family
guy food
female
gossip
news and media women's health
lesbian, gay, bisexual, and transgendered
dating title ix gender equity
by culture or group education
cultures and groups
article
women's studies
college and university departments and programs
feminism celebrity
finance celebdirectories cooking care chats and forums

FIG.19 romance spa    column
rama           world profile                              web parenting
                         links                        catalog
              entertainment  online
                         business         guide
      nutrition  relationship                    dating
pageant       style   health  article
              fitness  travel  women
protest                               books
                love   magazines
                    beauty
                           music
                    fashion                        ten link           female
                      game   tip   tv
                                              american
              parent    celebrity
              money                gossip guy                      horoscope
                  food                    celeb decor
                                     guilt
         pain
       concentrate

FIG.20 talk           column
   ten
              spa dating
parent        business  travel
         tip article    magazines    guide
              health
money         beauty  women
              fashion
guy music
              style game food crush decor     horoscope
              celebrity  gossip

FIG.22 zines american business women's association stay-at-home mothers
recreation business and economy
shopping and services training mom sharing title ix gender equity
tip quiz resource by culture or group
risk work business
review parenting organizations
feature home information
menopause life travel sports education
style fitness cultures and groups adventure
entertainment college and university departments and programs women's studies
magazines companion
health feminism
love
trip relationship finance web directories
movies and film beauty destination
fashion family
idea festival news and media
women's health cooking
lesbian, gay, bisexual, and transgendered
dating care chats and forums

Education

Directory > Education

INSIDE YAHOO!
Yahoo! Education - K-12 Schools - Colleges - Online Degrees - Reference CATEGORIES (What's This?)

Top Categories
- Adult and Continuing Education (276)
- Browse by Region (168)
- By Culture or Group (306)
- By Subject (974)

- Distance Learning (672)
- Higher Education (17246) NEW!
- K-12 (54564) NEW!

- Job and Employment Resources@
- Journals (39)
- Legislation (10)
- Literacy (33)
- News and Media (83)
- Organizations (2490)
- Policy (48)

Additional Categories
- Academic Competitions (92)
- Bibliographies (7)
- Bilingual (17)
- Business to Business@
- Career and Vocational (302)
- Chats and Forums (22)
- Conferences (28)

SPONSOR RESULTS

Education Degree Study
Earn a doctoral, master's or bachelor's degree online at Walden....
info.waldenu.edu Earn an Accredited Degree Online
US or Canada residents find an online degree in business,...
www.nextag.com Over 65 Online Degrees and Courses
Canyon College offers online Bachelor, Masters and Doctorate degrees.
www.canyoncollege.edu Free College Education Information
Find the school that's right for you.

CONVENTIONAL ART
FIG. 27

GUI FOR SUBJECT MATTER NAVIGATION USING MAPS AND SEARCH TERMS

CROSS REFERENCE TO RELATED APPLICATIONS

This application is a continuation of U.S. patent application Ser. No. 11/957,281, filed 14 Dec. 2007, entitled GUI FOR SUBJECT MATTER NAVIGATION USING MAPS AND SEARCH TERMS, which is a non-provisional of U.S. Provisional Patent Application No. 60/891,542, filed Feb. 26, 2007, entitled GUI FOR SUBJECT MATTER NAVIGATION USING MAPS AND SEARCH TERMS, which is incorporated herein by reference in its entirety.

BACKGROUND OF THE INVENTION

1. Field of the Invention

The present invention relates to techniques for navigating categorized information using a graphical user interface.

2. Description of the Related Art

One of the issues in modern search engine development is allowing the user to navigate pre-categorized information, which is arranged by theme, or subject matter. For example, on Yahoo, www.yahoo.com, it is possible to view a tree-like taxonomy of information that has been indexed by Yahoo. The structure of this taxonomy is tree-like, moving from the broadest level, to more detailed, and so forth. To navigate the tree, the user clicks on links (which represent branches and sub-branches of the tree), which the user views as most relevant to his particular interests, and therefore likely to lead to the document that he is searching for. Examples of this tree structure are illustrated in the screen shots in FIGS. 25-27, in this case, with the subject matter centered around "kids/children."

One of the difficulties for most users with such tree-like structures is the fact that the human mind does not normally operate in this fashion—for most people, information is not structured into a tree, but has many connections between branches of the tree, sub-branches of the tree, connections between sub-branches of different branches, and so forth—in other words, information, as perceived by the human mind, has many more connections and inter-relationships than would be obvious from simply organizing it into a tree-like taxonomy.

Another difficulty with the tree-like organization of information is the fact that moving "horizontally," or moving "at an angle" (conceptually), where the user moves from one sub-branch on one level to a different sub-branch, and possibly to a different level, of the tree, is usually not permitted. The user, having "gone down" into a particular branch, sub-branch, sub-sub-branch, etc., and having discovered that the information there is not what he is seeking, needs to go back "up" the tree, and repeat the process again for a different branch, sub-branch, etc. This is a fairly cumbersome method of navigating organized information, and is one reason why many users are in fact unaware that a search engine, such as Yahoo, provide for this form of searching for information—while such an organization makes it easy for structuring searches in a computer, it is counter intuitive to most people, and therefore, frequently useless.

Accordingly, there is a need in the art to enable users to navigate information organized by subject matter or theme, in an intuitive and easy to understand manner.

SUMMARY OF THE INVENTION

Accordingly, the present invention is related to a system, method and computer program product for using graphical maps as a user interface for navigation of categorized information that substantially obviates one or more of the disadvantages of the related art.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIGS. 1-13 illustrate an exemplary use of the present invention for navigating the subject matter of kids/children.

FIGS. 14-24 illustrate an exemplary use of the present invention for navigating the subject matter of women/women's issues.

Figure 25:
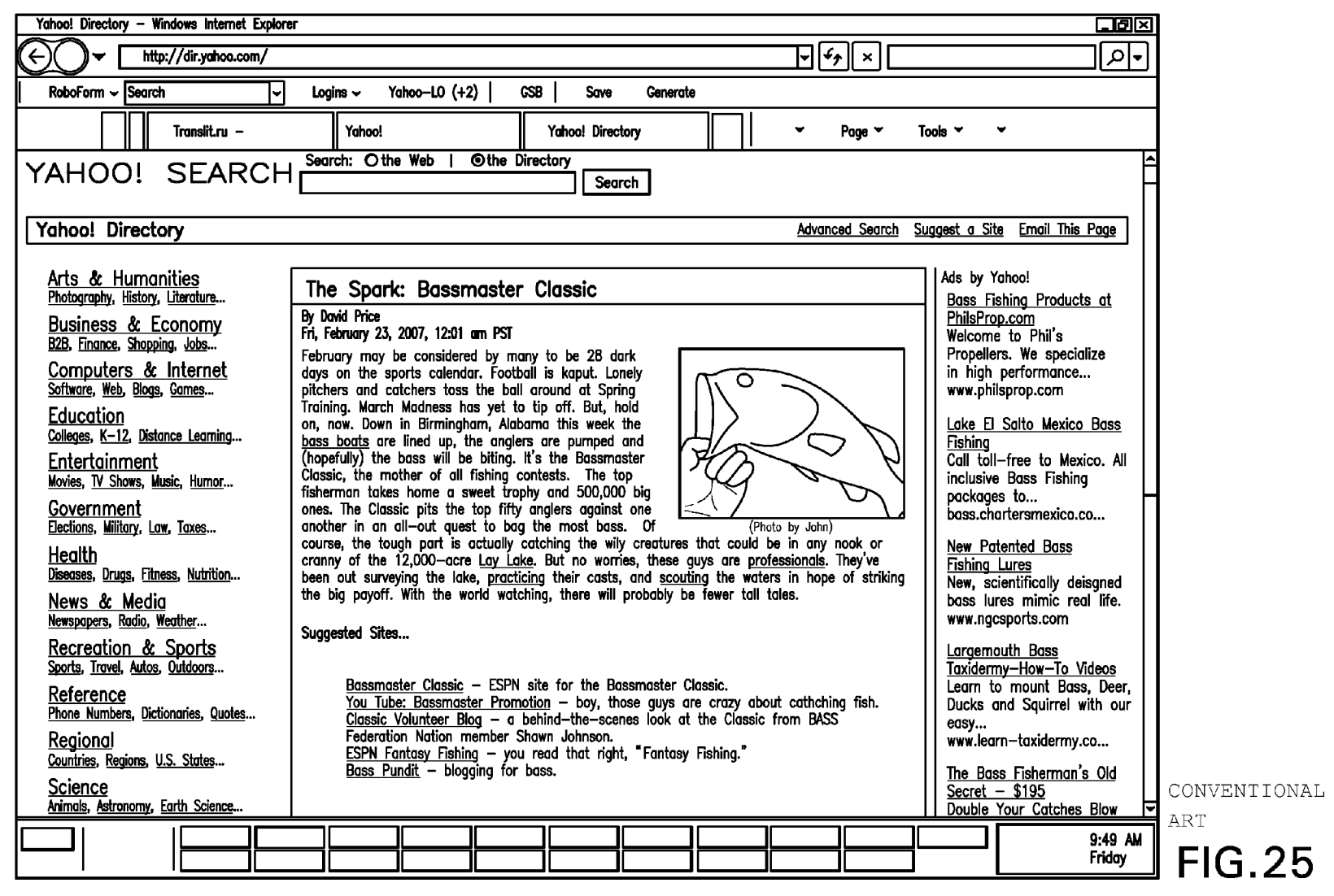
Figure 27:
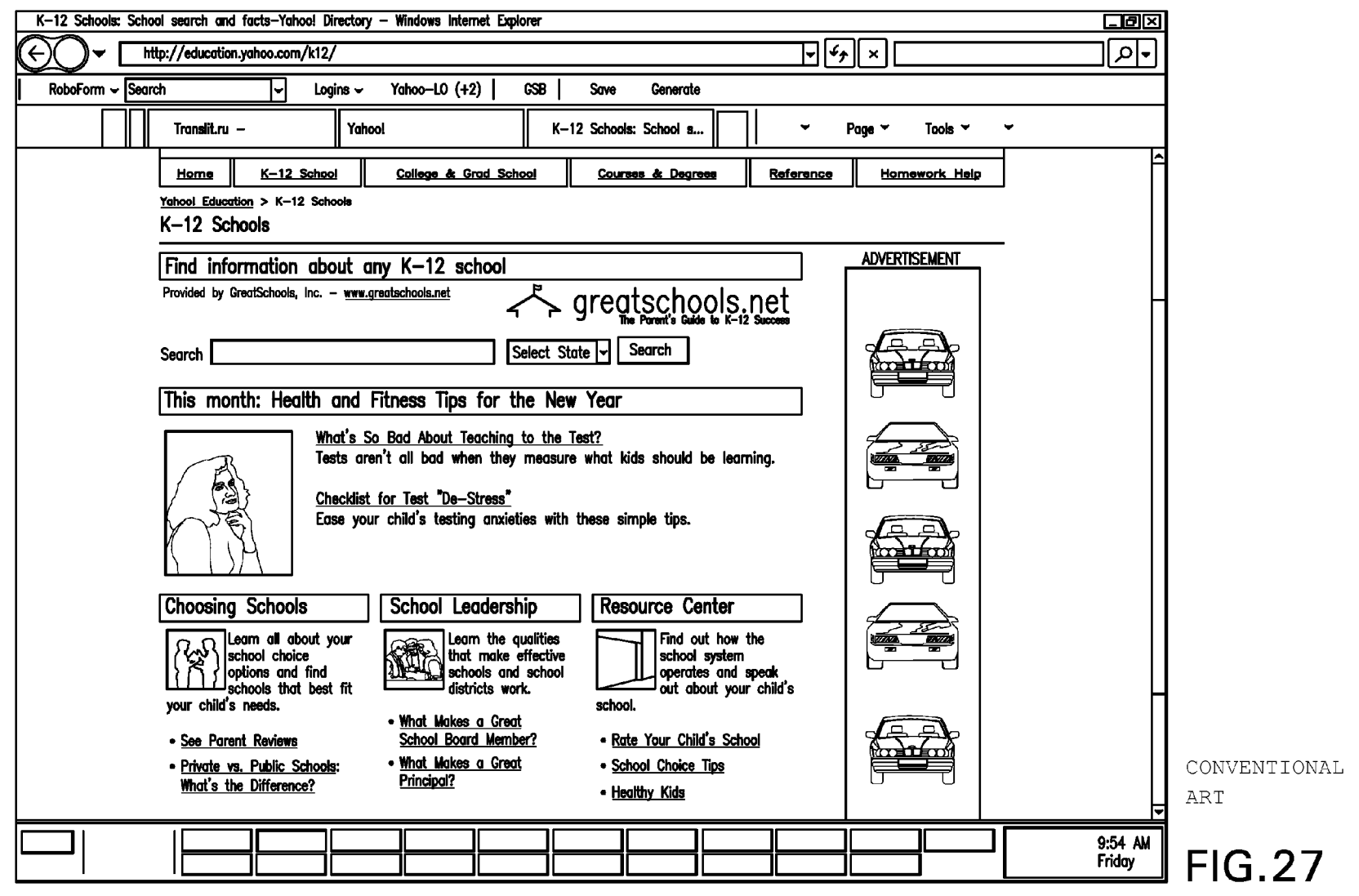

FIG. 25-27 show screenshots of a conventional tree-like organization of information.

DETAILED DESCRIPTION OF THE PREFERRED EMBODIMENTS

Figure 2:
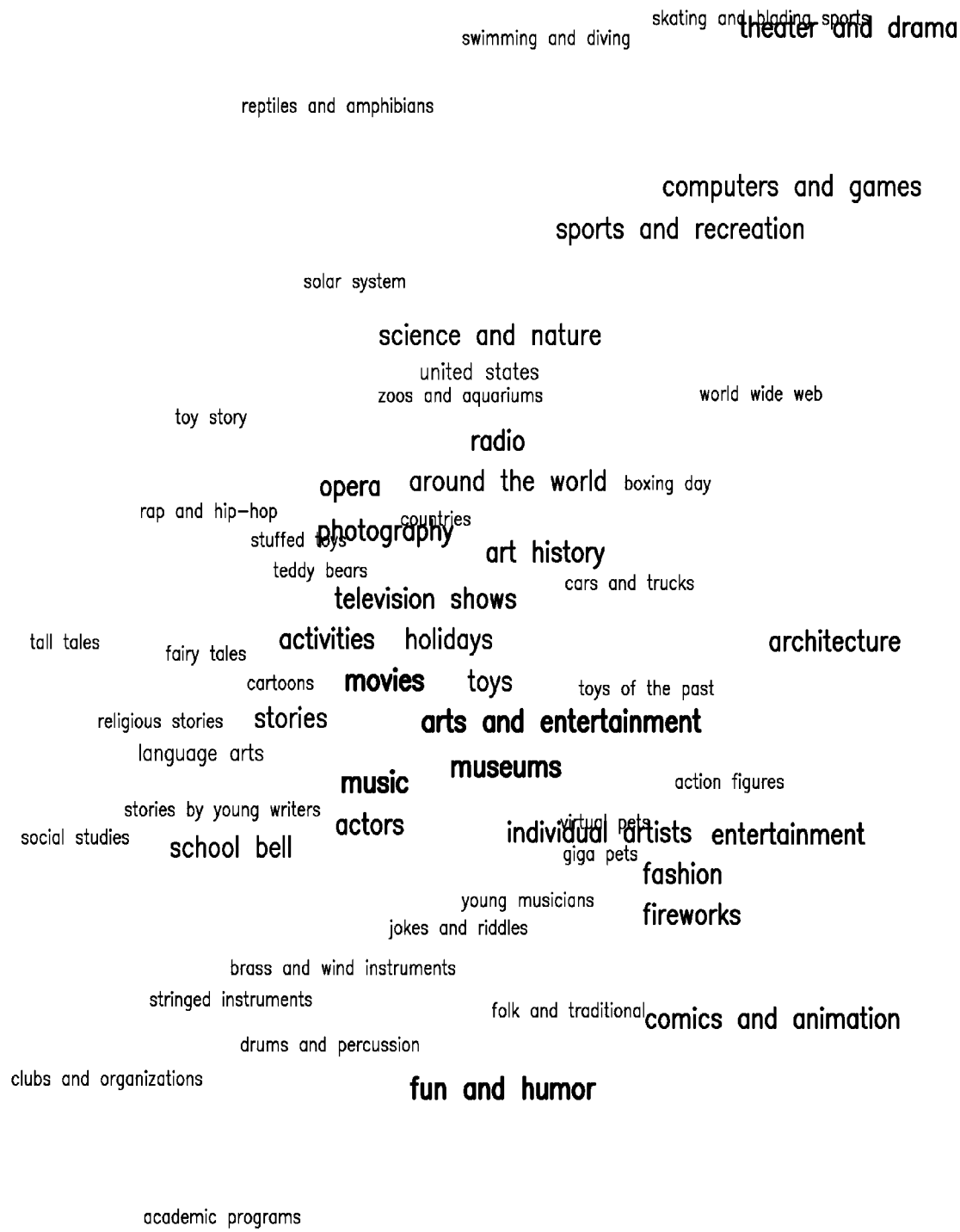

Reference will now be made in detail to the embodiments of the present invention, examples of which are illustrated in the accompanying drawings.

The approach described herein relies on neural networks, such as described in U.S. patent application Ser. No. 11/468,048; Filed: Aug. 29, 2006, entitled NEURAL NETWORK FOR ELECTRONIC SEARCH APPLICATIONS, incorporated herein by reference, to formulate a multi-dimensional map, on which words, corresponding to search terms and subject matters, are represented. Such a map can then be used for navigation. Also, such a map can be combined with displays of links to the web pages at issue, as well as annotations, such as described in U.S. patent application Ser. No. 11/535,306; Filed: Sep. 26, 2006, entitled USE OF NEURAL NETWORKS FOR ANNOTATING SEARCH RESULTS and Provisional U.S. Patent Appl. No. 60/890,507; Filed: Feb. 19, 2007, entitled SEARCH ENGINE GRAPHICAL INTERFACE USING MAPS AND IMAGES, both of which are incorporated herein by reference in their entirety.

The neural network underlying each such pre-made map can be initially created, as described in U.S. Pat. No. 7,496,548, incorporated herein by reference in its entirety, from a set of documents that are known a priori to relate to the particular subject matter. These documents can be manually pre-selected, or can be generated based on an index available from search engines, such as from Yahoo, Inc., or can be generated based on a number of broad, intermediate, and narrow searches that (in the view of the searcher) relate to the subject matter. In this discussion, two examples are used, "children" and "women," chosen in this case primarily because of the breadth of the subject matter. As will be recognized by one of ordinary skill in the art, the breadth of the subject matter means that if the information were structured and presented as a taxonomic tree, the tree would have many levels in its hierarchy (branches, sub-branches, sub-sub-branches, etc.). Therefore, these two examples provide a good illustration of how the organization of the information using neural networks is done, and how navigation of such information is then performed, using the approach described herein.

Once the initial set of documents is chosen, and an initial map is constructed, it is also possible to edit the map manually, if desired. For example, if the subject matter is children (and the map is intended to be of interest to children), the map can be manually edited to exclude adult-related material, pornographic material, or anything that accidentally ended up included in the map, but is subjectively believed, by whoever constructs the map, to not belong there.

Also, if a particular subject matter is believed to be closely related to the subject matter at issue, additional searches can be performed to identify documents related to that related subject matter, and those documents (or, equivalently, a map corresponding to the documents) can be merged into the neural network that underlies the pre-made map at issue.

In this manner, a number of such maps can be created, for each subject matter, and it will be appreciated that each such map corresponds to a branch of a tree in a conventional search engine's index, or, equivalently, to a directory. Furthermore, the map can be modified over time, for example, if it is observed that certain search terms, or combinations of search terms, or subject matter underlie those terms, is of higher than expected interest to most users, the relative importance of those terms can be increased, which would result in a modified map. That map can then be presented to users as "the" map for "children."

FIG. 1 illustrates an exemplary pre-made map for the subject matter "children." As will be seen in FIG. 1, the subject matters, or themes, within the broader category "children" that are of a particular importance are highlighted in bold (in essence, corresponding to branches from the "children" tree, or, equivalently, subdirectories within the "children" directory). This map, as discussed earlier, can be pre-made.

FIG. 2 illustrates an example of how the map can be navigated. By bringing the cursor to the "arts and entertainment" search term (see the hand-shaped icon near the words "arts and entertainment" in the map), the map is rearranged, so that some of the search terms become less important (for example, "computers and games," which used to be highlighted, is no longer highlighted, indicating that it is less relevant to the user who is interested in the subject matter of the sub-branch "arts and entertainment").

FIG. 3 illustrates what would happen to the map if, in addition to bringing the cursor over to "arts and entertainment" the user clicked on this search term. The map, as will be seen, is again rearranged, with, in this case, font size indicating relative importance of the displayed search terms (as well as the distance on the screen from the primary search term ("arts and entertainment")) to the other search terms (including newly displayed ones). In other words, the manner of display of each search term is dynamic (as opposed to static), with the display incorporating the "depth" of the search term, as far as its relevance to the current search is concerned, based on the underlying neural network. As such, the map may be conceptually viewed as a three-dimensional map, with the two dimensions displayed on the screen in the sense of X and Y, and the third dimension (depth into the tree branch) displayed graphically using such artifacts as font, color, transparency, animation effects, etc. When the user performs some operations on the map (e.g., deleting a term, or emphasizing importance of the term), the map is rearranged (e.g., the coefficients in the underlying neural network change0, and the same term can appear different on the screen (different font, color, transparency, size, etc.) In effect, by clicking on the term "arts and entertainment," the user selected a taxonomic branch, or directory, within the subject matter "children." Note also that the user does not need to view the process he is going through in terms of initiating additional search engine searches, even though this is what he is in effect doing.

FIG. 4 illustrates an additional example of how the map can be manipulated, by bringing the cursor to the search term "music." The map is again rearranged, as illustrated in FIG. 4.

Figure 5:
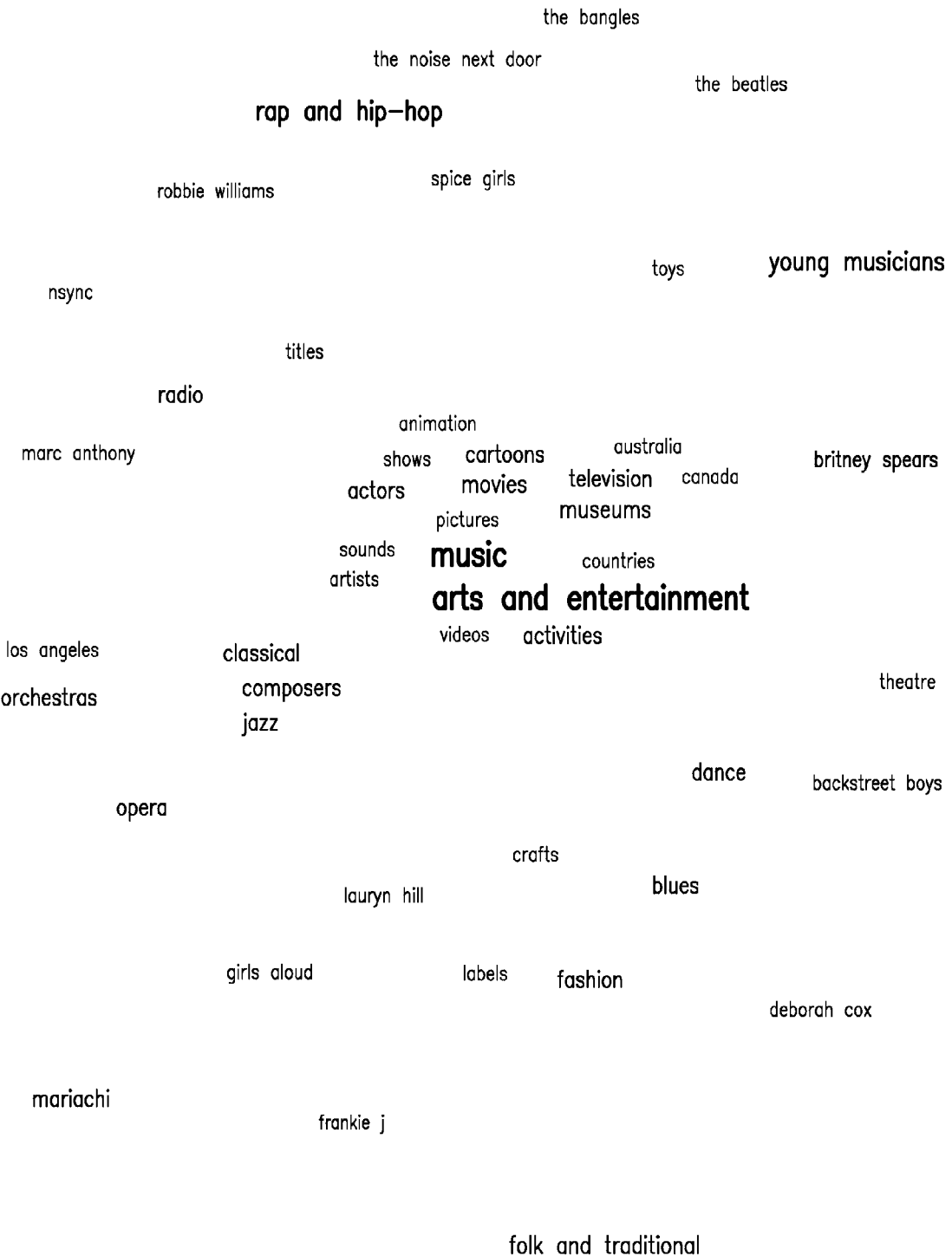

FIG. 5 illustrates what happens to the map when the search term "music" is clicked on. This map represents, in a sense, a combination of the branches "arts and entertainment" and "music"—in essence, the map that is displayed illustrates search terms that are relevant to both of these branches, with location and font size (and, optionally, font color) indicative of those terms that are particularly relevant to both terms "arts and entertainment" and "music," and smaller font being indicative of the search term that is only primarily relevant to one of the two highlighted search terms.

FIG. 6 illustrates how the user can navigate down another branch within the "children" tree, in this case, the "science and nature" branch. In effect FIG. 6 represents FIG. 1, where the cursor is brought over to the "science and nature" term. Note how the map changes from that shown in FIG. 1 to that shown in FIG. 6. By clicking on the "science and nature" search term, the map of FIG. 7 (corresponding to that branch, or directory) is displayed. FIG. 8 illustrates how the map is rearranged when the user brings the cursor over to the "paleontology" search term (i.e., conceptually moving "deeper" into the tree). In FIG. 9, the user has clicked on the term "paleontology," and the resulting map is displayed in FIG. 9.

FIG. 10 illustrates navigation down another branch, in this case, the "computers and games" branch. In this case, FIG. 10 is what results when, in the map of FIG. 1, the user brings the cursor to the "computers and games" search term. FIG. 11 is an illustration of what happens when the user clicks on the search term "computers and games," illustrating how the map changes to correspond to the selection. FIG. 12 illustrates, in essence, traveling, or navigating, down the branch, where the user brings the cursor to the term "online games." FIG. 13 is an illustration of what happens to the map when the search term "online games" is clicked on.

Figure 14:
Figure 15:
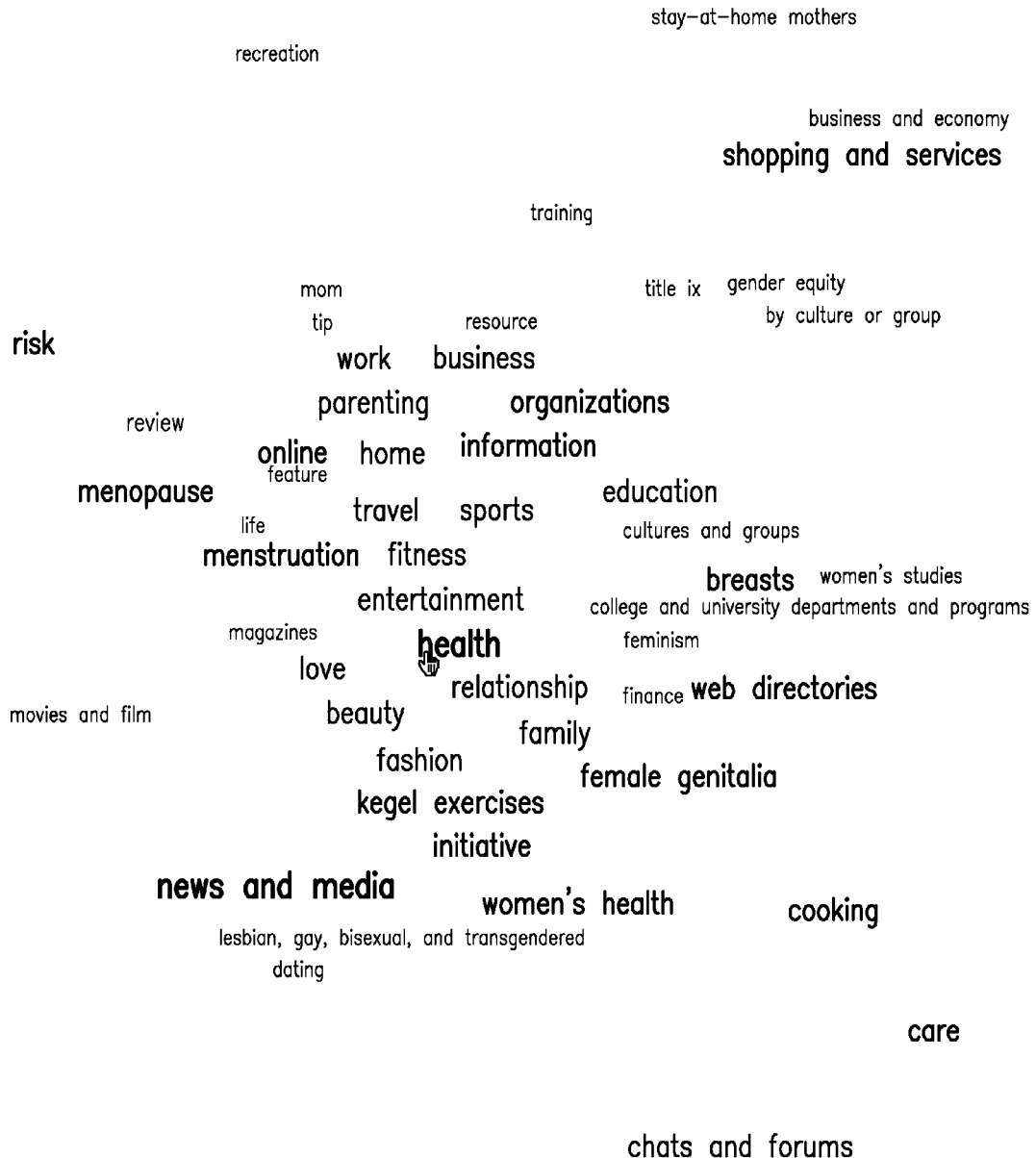
Figure 16:
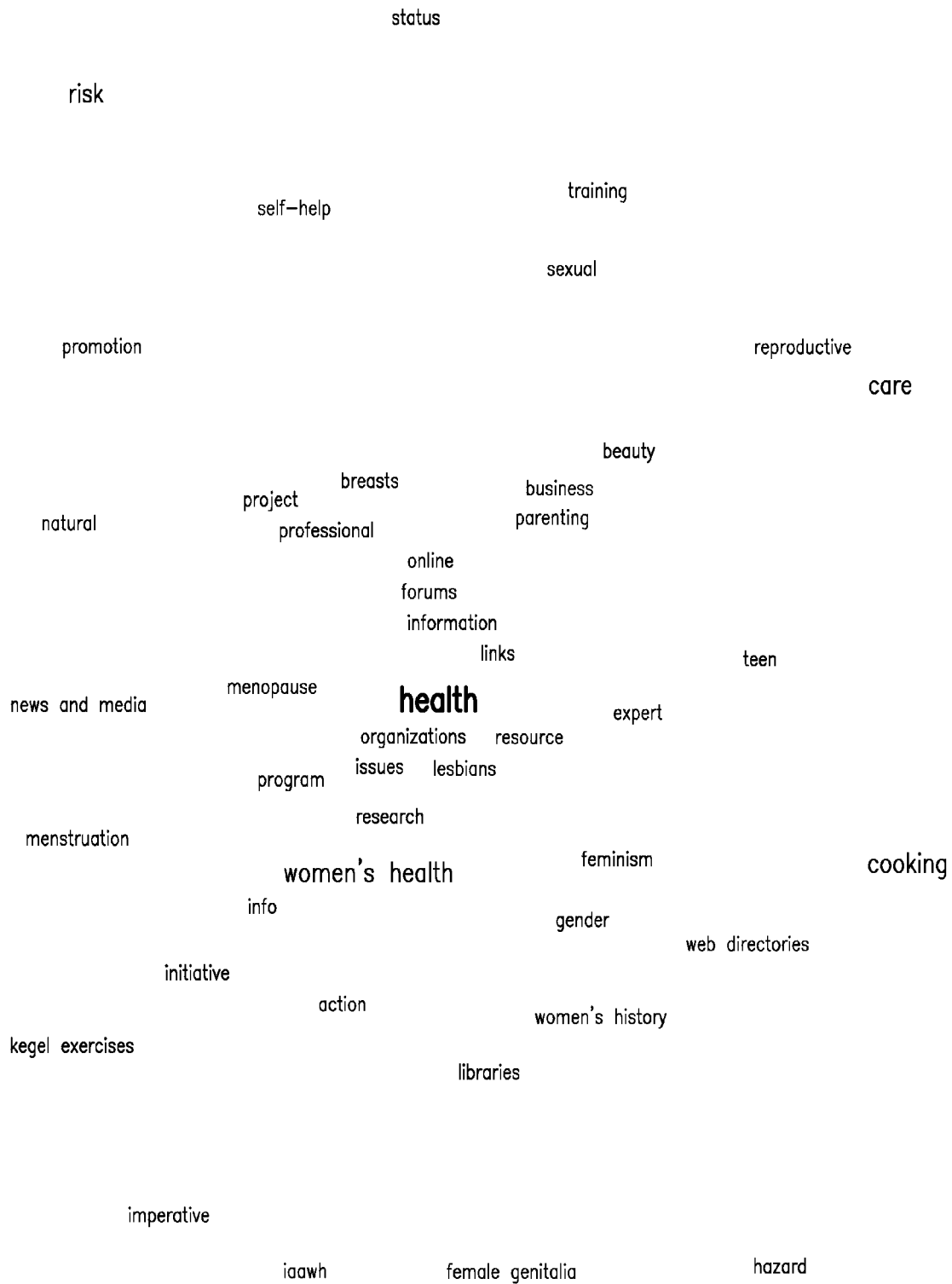
Figure 17:
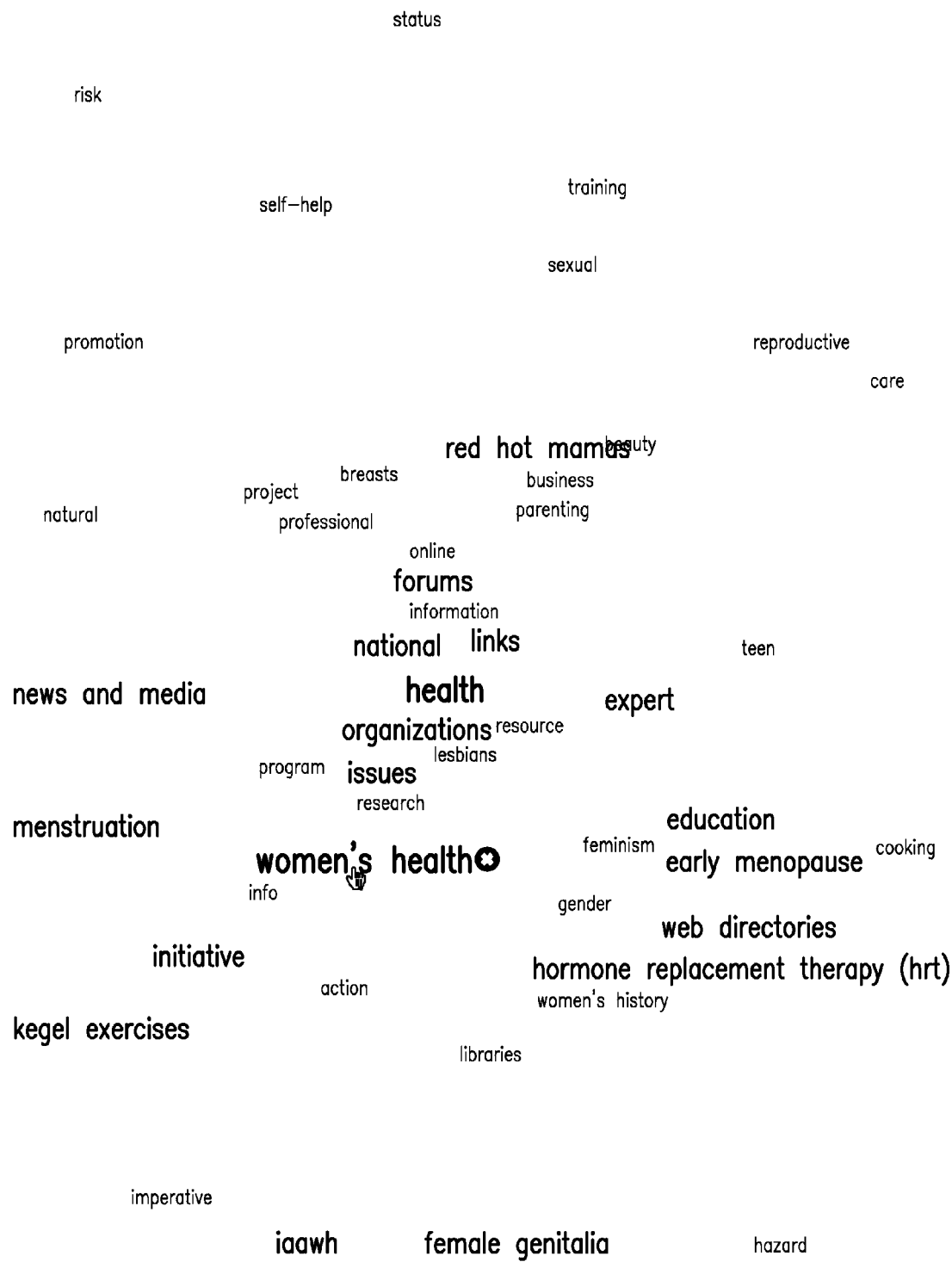

FIGS. 14-24 illustrate how the principles described above apply to another relatively broad subject matter area, in this case, women. FIG. 14 illustrates the map for the subject matter, with a highlighted terms generally corresponding to the branches of the tree—work, business, parenting, home, travel, etc. As with the case of the "children" tree/directory, by bringing the cursor to the "health" term, in FIG. 15, the map changes to show sub-branches under "health". FIG. 16 illustrates the map for the sub-branch "health." FIG. 17 illustrates what happens when the user brings the cursor to the search term "women's health." FIG. 18 illustrates what happens when the user clicks on the term "women's health"—essentially, traveling down into the tree.

Figure 21:
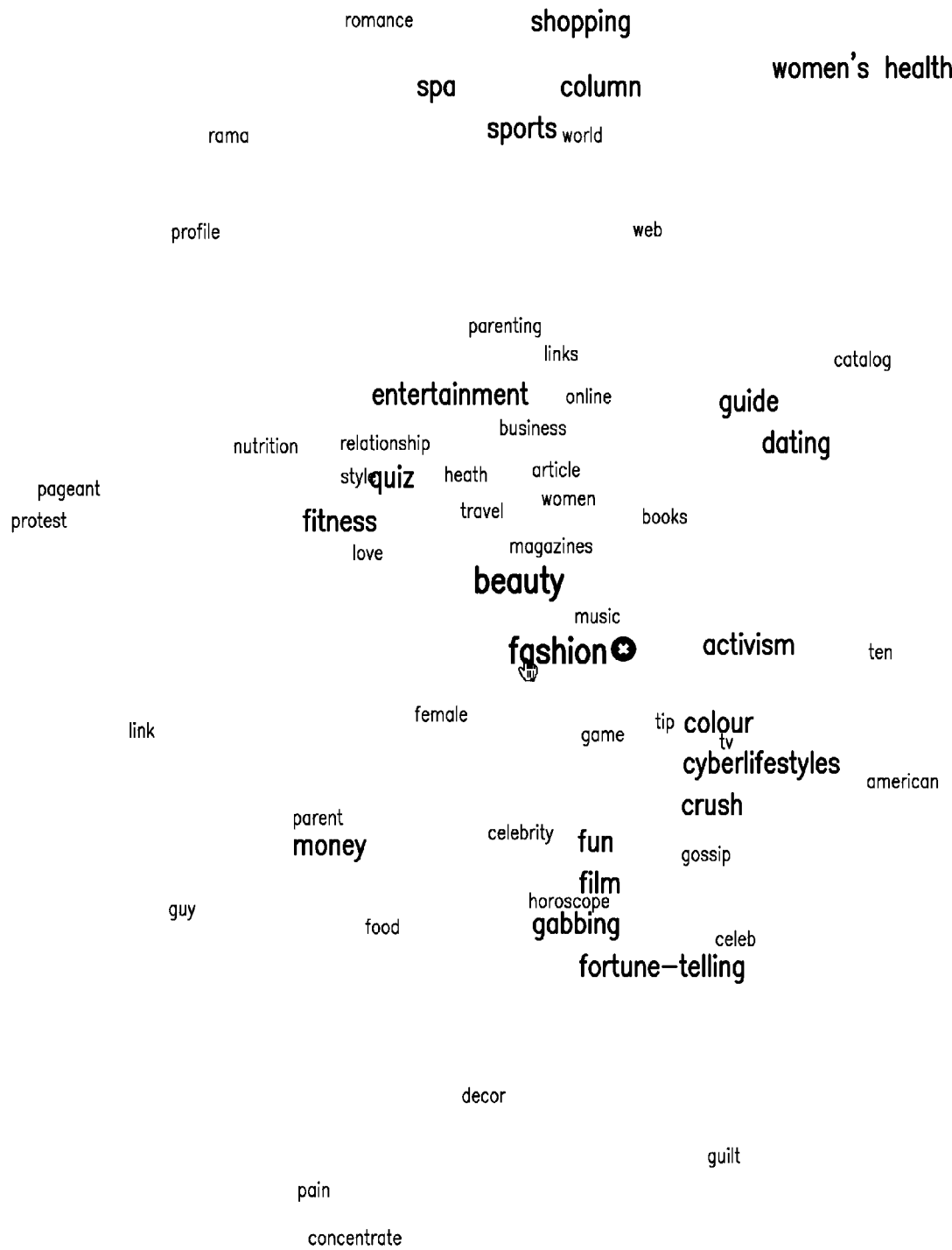
Figure 24:

FIG. 19 illustrates the map of FIG. 14, where the user brought the cursor to the search term "beauty." FIG. 20 illustrates the map for the sub-branch "beauty"—in other words, what happen when the user clicks on the term "beauty." FIG. 21 illustrates navigation within the "beauty" sub-branch (directory)—where the user brings the cursor to the term "fashion." FIG. 22 illustrates what happens when the user clicks on the term "fashion." FIG. 23 illustrates the map of FIG. 14, where the user brings the cursor to the search term "travel." FIG. 14 illustrates the map for the "travel" sub-branch (directory).

Furthermore, it will be appreciated that an already existing map (in other words, an already existing neural network) can be used to index other documents, and identify relevant documents out of a larger set of documents.

Figure 28:
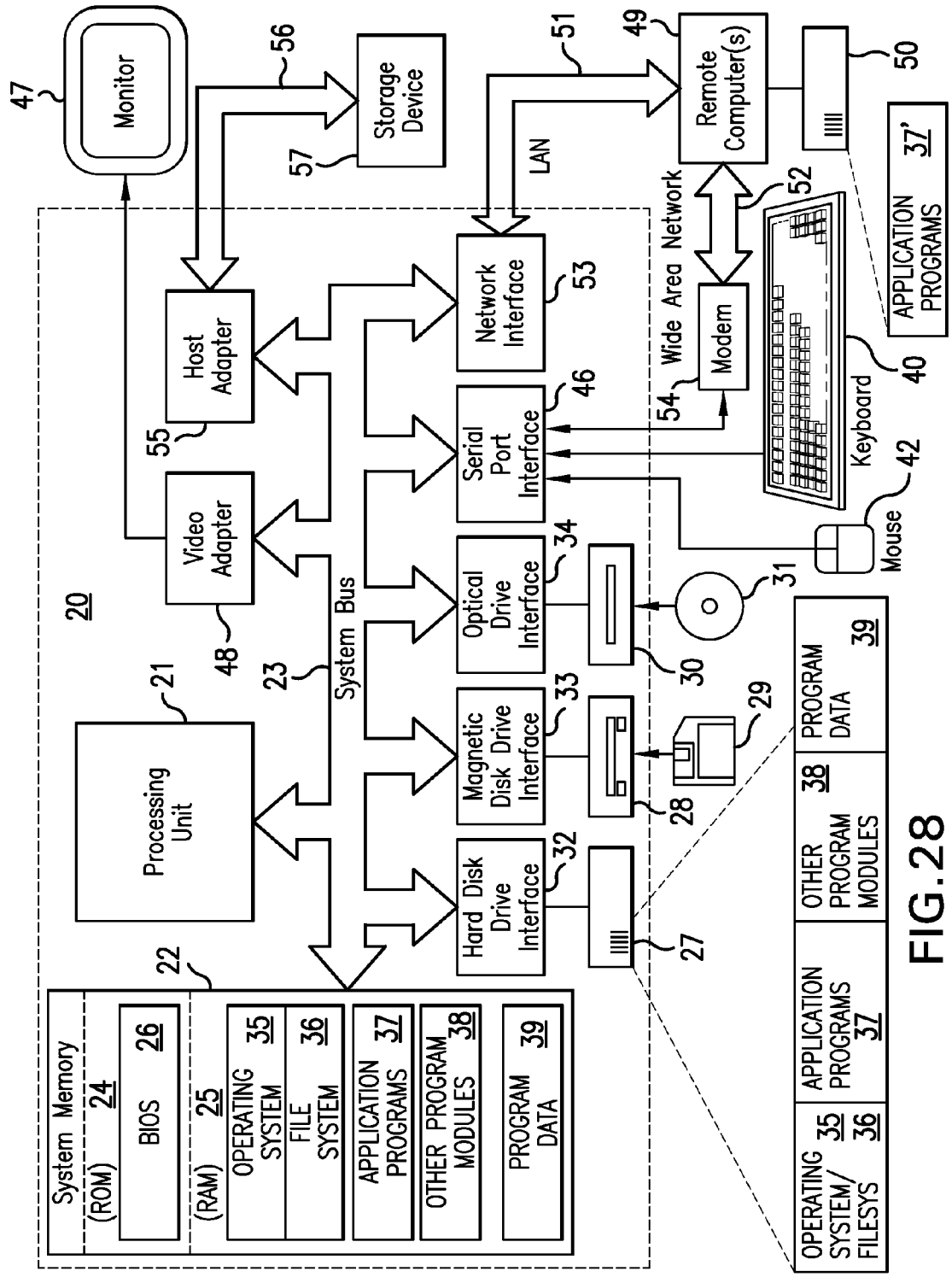
FIG. 28 illustrates an exemplary computer system on which the invention may be implemented.

With reference to FIG. 28, an exemplary computer system, where the invention can be implemented as a system, method and computer program product that includes a computer useable recording medium having computer program logic recorded thereon for executing on at least one processor for implementing the method, and/or including a number of software modules for performing the method steps, includes a general purpose computing device in the form of a user-side computer and/or server-side computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 20, such as during start-up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for navigating categorized information, the system comprising:
   a processor;
   a memory coupled the processor;
   computer code loaded into the memory for performing the functions of:
   displaying a two-dimensional map, the map showing search terms relating to a subject matter, where a position of the search terms corresponds to relationships between all the terms;
   dynamically changing display of the search terms and position of the search terms relative to each other changes dynamically based on user input into the map, the display corresponding to relative importance of the search terms to the subject matter, the display including any of font color, font size, font transparency, distance between search terms and positioning of the search terms within the map relative to each other;
   at least some of the search terms corresponding to different branches of a taxonomic tree;
   in response to input from a user, changing a context a search and selecting a different branch of the taxonomic tree by selecting one of the search terms and without moving upwards in the taxonomic tree to select different search results based on a combination of different branches;
   displayed separately from the map, a plurality of hyperlinks corresponding to the different search result;
   a bidirectional neural network underlying the map, wherein the display, the position of the search terms on the map and a selection of the displayed search terms are derived from the neural network; and displaying to the user additional search terms derived from the search results by the neural network.

2. The system of claim 1, wherein positioning of a cursor over one of the search terms rearranges the search terms on the map to correspond to an increased relevance of that search term, while the cursor is over that search term.

3. The system of claim 2, wherein clicking on that search term corresponds to navigating into a sub-subject matter of that search term.

4. The system of claim 2, wherein clicking on that search term rearranges the map to increase importance of the selected search term in the search query.

5. The system of claim 2, wherein clicking on an icon next to one of the search terms rearranges the map to decrease importance of the selected search term in the search query.

6. The system of claim 2, wherein clicking on an icon next to one of the search terms rearranges the map corresponding to adding a Boolean "NOT" operator for the selected displayed search term in the search query.

7. A computer-implemented method for navigating categorized information, the method being performed on a computer having a processor and a memory, the method comprising:

displaying a two-dimensional map, the map showing search terms relating to a subject matter, where a position of the search terms corresponds to relationships between all the search terms;

dynamically changing a display of the terms and a position of the search terms relative to each other based on user input into the map, the display corresponding to relative importance of the search terms to the subject matter, the display including any of font color, font size, font transparency, distance between search terms and positioning of the search terms within the map relative to each other;

at least some of the displayed search terms corresponding to different branches of a taxonomic tree;

in response to input from a user, changing a context of a search and selecting a different branch of the taxonomic tree when the user selects one of the search terms and without moving upwards in the taxonomic tree to select different search results based on a combination of different branches;

separately from the map, displaying a plurality of hyperlink results map;

deriving the display of the search terms, the position of the search terms on the map and a selection of the displayed search terms from a bidirectional neural network that underlies the map; and displaying to the user additional search terms derived from the search results by the bidirectional neural network.

8. The method of claim 7, wherein positioning of a cursor over one of the search terms rearranges the search terms on the map to correspond to an increased relevance of that search term, while the cursor is over that search term.

9. The method of claim 8, wherein clicking on that search term corresponds to navigating into a sub-subject matter of that search term.

10. The method of claim 8, wherein clicking on that search term rearranges the map to increase importance of the selected search term in the search query.

11. The method of claim 8, wherein clicking on an icon next to one of the search terms rearranges the map to decrease importance of the selected search term in the search query.

12. The method of claim 8, wherein clicking on an icon next to one of the search terms rearranges the map corresponding to adding a Boolean "NOT" operator for the selected displayed search term in the search query.

13. A computer program product comprising a computer useable storage medium having computer program logic recorded thereon for executing on at least one processor, the computer program logic comprising computer program code for implementing the method of claim 7.

14. The method of claim 1, wherein the map is pre-made for the particular search query.

15. The method of claim 1, wherein a projection of the neural network onto the map is rearranged in response to user input into the map.

* * * * *